Figure 1:
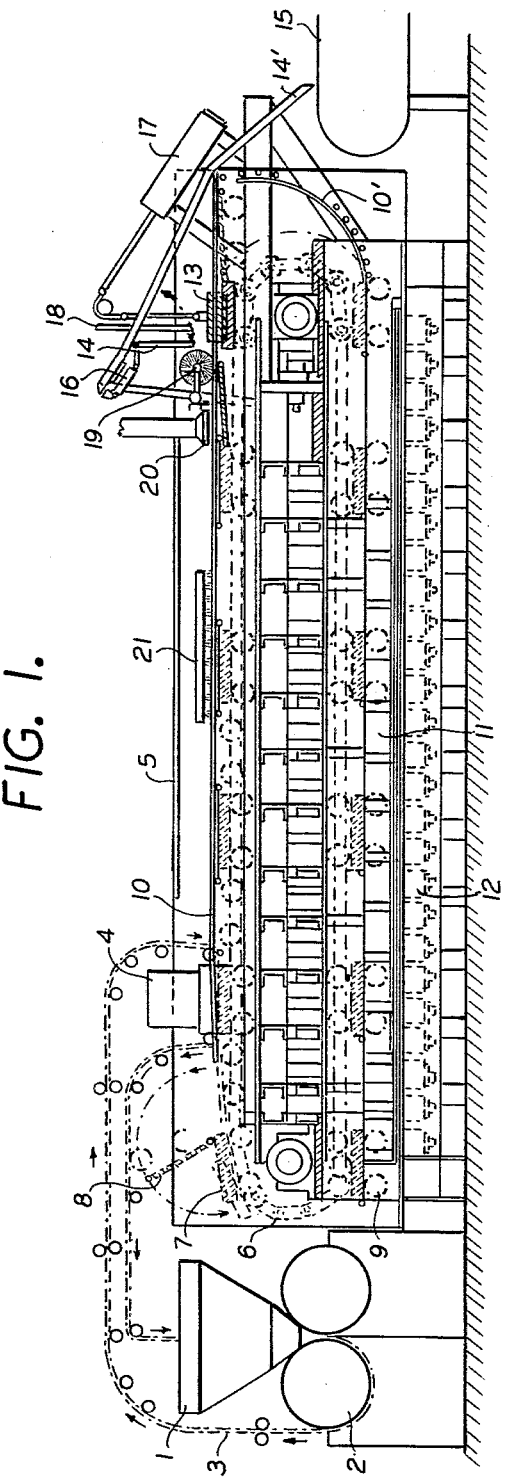

Nov. 2, 1965    G. FASSINA    3,214,792
APPARATUS FOR THE VULCANIZATION OF ARTICLES MADE
OF RUBBER OR LIKE MATERIAL
Filed Sept. 5, 1963    3 Sheets-Sheet 2

INVENTOR
GIOVANNI FASSINA
BY
ATTORNEY.

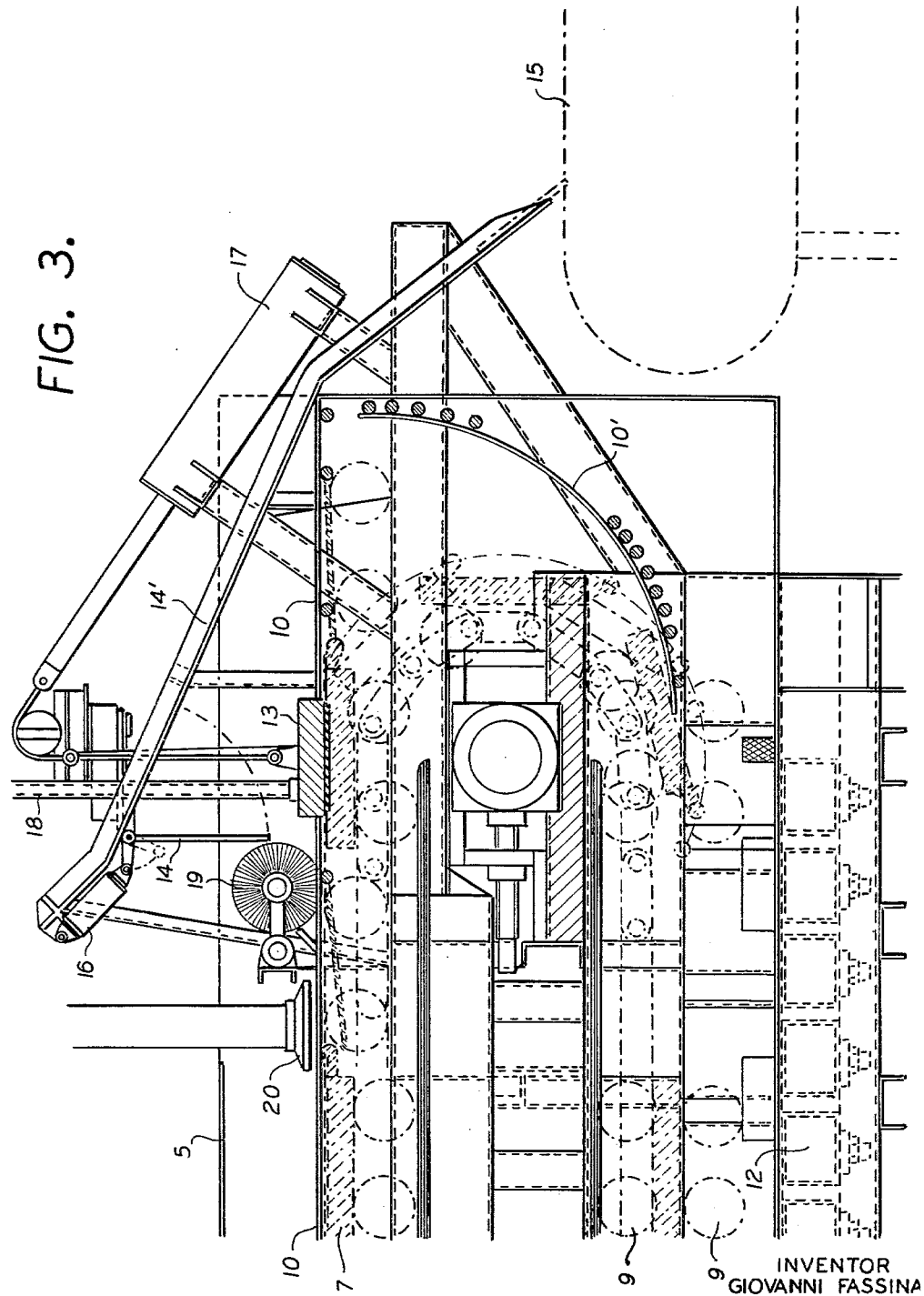

United States Patent Office 3,214,792
Patented Nov. 2, 1965

3,214,792
APPARATUS FOR THE VULCANIZATION OF ARTICLES MADE OF RUBBER OR LIKE MATERIAL
Giovanni Fassina, Vigevano, Italy, assignor to Paranova S.p.A. Sezione Articoli per Calzature, Vigevano (Pavia), Italy, a corporation of Italy
Filed Sept. 5, 1963, Ser. No. 306,826
Claims priority, application Italy, Sept. 19, 1962, 18,455/62, Patent 27,279
10 Claims. (Cl. 18—4)

The present invention relates to an apparatus operating in a continuous and automatic operating cycle for the production of pressed articles made of rubber or similar material, such as plastic material, which articles are to be submitted during the pressing operation to a heat treatment in order to vulcanize or polymerize the material.

It is one object of the present invention to provide an apparatus for the vulcanization of articles made of rubber or like material, in which the vulcanization of the articles is brought about under pressure in a confined space constituting a thermic tunnel, at one end of which a material feeding device and at the opposite end of which an ejector for the finished articles are provided.

It is another object of the present invention to provide an apparatus for the vulcanization of articles made of rubber or like material, wherein the feeding device comprises substantially a hopper disposed above a rolling mill which produces a continuous ribbon made of raw-rubber or similar material. The ribbon is moved from the hopper, passes under a stamping press and returns thereafter as a scrap ribbon into the hopper, where raw material is continuously added, in order to secure an uninterrupted feeding of material to the rolling mill.

It is still another object of the present invention to provide an apparatus for the vulcanization of articles made of rubber or like material, in which a sequence of molds slide or travel below a press in a closed circuit, which molds are secured to a chain. Each of the molds has a cover and the molds, open on one side, have their opening below a stamping press to receive a cut stamped cut from the rubber ribbon, and to close up automatically the molds by means of the covers prior to their entrance into a vulcanizing thermic tunnel in a pressed state. At the end of the tunnel, from which the vulcanized material emerges and upon terminating the time period required for the vulcanization, the molds arrive at an ejector device, which comprises cleaning elements with corresponding preparation elements for the molds, which latter prepare the molds for the re-entering into the working cycle by spraying them with an antiadhesive solution.

Figure 2:
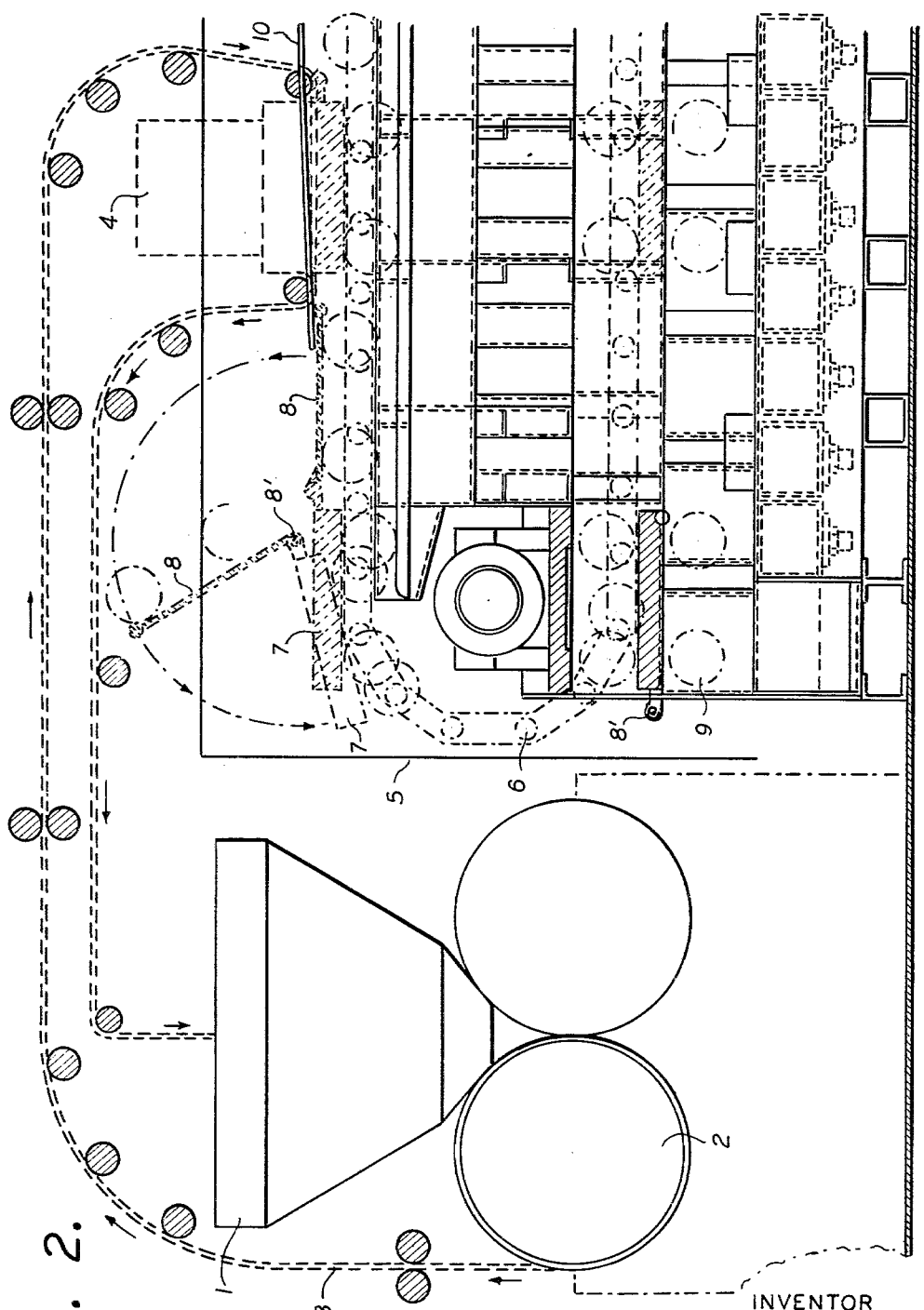

With these and other objects in view, which will become apparent in the following detailed description, the present invention will be clearly understood in connection with the accompanying drawings, in which:

FIGURE 1 discloses at a very reduced scale a side elevation of a complete apparatus, designed according to the present invention;

FIG. 2 shows, at a larger scale, a side elevation of one end portion of the apparatus shown in FIG. 1 and particularly the feeding device disposed at the entrance joint of a vulcanizing thermic tunnel; and FIG. 3 shows, at the same scale as FIG. 2, an ejector device disposed at the end of the vulcanizing thermic tunnel, at which the vulcanized articles emerge, for the ejection of the finished articles.

Referring now to the drawings, and particularly to FIGS. 1 and 2, the raw material, such as rubber, plastic or the like, is fed to a rolling mill 2 from a hopper 1 disposed above the rolling mill 2, which supplies a continuous ribbon 3 of the raw material. The ribbon 3 passes under a stamping press 4, by which pieces of raw material are stamped out from the ribbon 3. The latter returns then as a scrap material to the hopper, wherein it is recovered and which hopper receives continuously fresh raw material.

The stamping operation, as well as all additional operations take place in a confined space consisting of a thermic tunnel 5 constantly maintained at a predetermined temperature range for vulcanizing the material.

Molds 7 equipped with covers 8 and rollers or ball bearings mounted on the covers 8 and on the molds 7, respectively (not shown), for rotation, travel below the stamping press 4 and are moved along by an endless chain 6. The molds approach the press 4 with their opening at the top and with the cover 8 in its open position, and as soon as the molds 7 have received the stamped out piece of material, they are closed automatically again, since the covers 8 are hingedly connected to the molds 7 and equipped with strong return springs 8'.

The molds 7 reach the press 4 while moving along the upper part of the thermic tunnel 5. The covers 8 are maintained in their open position by means of an abutting guide 10 against the action of the return springs 8', as long as the cover 8 is still disposed opposite the press 4. The down-stream end of the guide 10 is disposed beyond the end of the press 4 in the direction of movement of the mold 7 and upon passing the press 4, the covers 8 assume their closed position by the action of the springs 8'.

The molds 7 which are now closed up by the covers 8 and are moved by the chain 6, turn from the upper linear reach in one direction to a lower linear reach in the opposite direction extending through the lower portion 11 (FIG. 1) of the thermic tunnel 5, where they are now submitted to a strong pressure. This pressure is exerted directly upon the cover 8 toward the mold and thus acts on the material inserted therein during the vulcanization process which now takes place in the lower portion 11 of the tunnel 5. The bottom of the lower portion 11 of the tunnel 5 is subdivided into a plurality of sections, each of the sections being forced upwardly by powerful springs 12 or equivalent means and provided with stops. Each section is equipped with a beveled receiving edge, projecting in the direction of the incoming mold, in order to smooth out the entrance of the front end of the mold into the respective sections by riding up the rollers or ball bearings 9 on the beveled receiving edges (not shown).

At the end of the pressure and vulcanization period, a curved guide 10' (FIG. 3) is provided in the lower portion 11 of the tunnel 5, in order to open again the covers 8 of the molds 7. The latter are moved upwardly again, to reassume their original position in the upper reach of the tunnel 5, while the open position of the covers 8 is now obtained again by the rectilinear guide 10 disposed in the upper reach of the tunnel 5.

While the molds 7 are now disposed again with their opening in upward direction at the end of the vulcanization period, a removal plate 13 is lowered by its own gravity upon the vulcanized article, which adheres to the removal plate 13 and is then removed from the mold 7. The article is then dropped onto a chute, on which it slides downwardly to be deposited on a conveyor band 15.

Before the lowering of the removal plate 13 takes place, a trap door 14', controlled by a pneumatic or hydraulic cylinder 16, equipped with a reciprocating piston, opens, and subsequently closes itself automatically as soon as the removal plate 13 carrying the removed article has been lifted again. The lowering of the removal plate 13, as well as its lifting are controlled by a cylinder 17 in which a piston (not shown) having a reciprocating connecting rod, the free end of which is secured to a cord, with the latter being in connection with the removal plate 13. The release of the article withdrawn from the mold is controlled by a tube 18, operating at first as a suction tube and upon lifting the article the tube 18 is converted into a blower tube, to release the article from the removal plate 13 after closing the trap door 14'.

As soon as the article has been removed from the mold, which is always transported by the chain 6, the mold passes below a brushing device 19 with rotating brushes which remove every possible residue still adhering to the mold 7. Thereafter the mold 7 passes below a suction pipe having a mouth 20 at its lower end, which removes completely any foreign matter still remaining in the mold 7.

The molds 7 pass below a spraying device 21 (FIG. 1) adapted to spray the inside of the molds 7 with a liquid having anti-adhesive characteristics, after being subjected to the cleaning process and the molds 7 are then moved further towards the stamping press 4, in order to start a new operating cycle, as set forth above.

The time required for the entire operating cycle from the feeding of the raw material into the mold 7 up to the removal of the vulcanized article from the mold 7 and the return of the latter to its original position can be exactly adjusted, so that the vulcanization of the raw material to obtain a vulcanized article can be carried out properly and completely. All intermediate operational steps are coordinated to the required vulcanization period.

While I have disclosed one embodiment of the present invention, it is to be understood that this embodiment is given by example only and not in a limiting sense, the scope of the present invention being determined by the objects and the claims.

I claim:

1. An apparatus for the vulcanization of articles made of rubber or like material comprising
    a housing defining a longitudinal tunnel adapted to be heated to a vulcanizing temperature,
    an endless conveyor chain movably mounted in said tunnel,
    a plurality of molds secured to said endless conveyor chain spaced apart from each other for movement with the latter,
    a cover hingedly secured to each of said molds,
    resilient means for retaining said cover in its closed position on the corresponding of said molds,
    a first station disposed above said endless conveyor chain for feeding raw material into said molds,
    pressure means disposed opposite said endless conveyor chain and exerting pressure upon said raw material by engagement with said covers during the passage of the molds through said tunnel for vulcanization of said raw material in each of said molds to produce vulcanized articles,
    a second station spaced apart from said first station and disposed above said endless conveyor chain including means for removing said vulcanized articles from the corresponding of said molds, and
    means disposed opposite said endless conveyor chain at a point prior to said second station for turning said covers into their open position, and rectilinear abutting guide means extending between said second and first stations for engaging said covers after passage thereof past said opening means to retain said covers in their open positions during the passage thereof through said second and first stations and permit said covers to close under the action of said resilient means after the covers have moved out of engagement with said guide means following the passage of the covers through said first station.

2. An apparatus for the vulcanization of articles made of rubber or like material comprising
    a housing defining a longitudinal tunnel adapted to be heated to a vulcanizing temperature,
    an endless conveyor chain movably mounted in said tunnel and having an upper reach and a lower reach,
    a plurality of molds secured to said endless conveyor chain spaced apart from each other for movement with the latter,
    a cover hingedly secured to each of said molds,
    resilient biasing means for automatically closing said cover on the corresponding of said molds,
    a first station disposed above the upper reach of said endless conveyor chain for feeding raw material into said molds,
    means for retaining said covers in their open positions against the action of said resilient means during the passage of each of said molds through said first station and permitting said covers to assume their closed position upon leaving said first station,
    a plurality of independently operable pressure means disposed opposite said lower reach of said endless conveyor chain and exerting pressure upon said raw material by engagement with said covers during the passage of the molds through said tunnel for vulcanization of said raw material in each of said molds to produce vulcanized articles,
    curved guide means disposed at about the end of said lower reach for turning said covers into their open position, and
    a second station spaced apart from said first station and disposed above said endless conveyor chain including means for removing said vulcanized articles from the corresponding of said molds upon return of the latter into said upper reach of said endless conveyor chain.

3. The apparatus, as set forth in claim 2, wherein
    said pressure means comprise a plurality of spring members,
    a plurality of sections disposed below said lower reach of said endless chain between said spring members and said molds, and
    said sections having beveled receiving edges projecting against the direction of movement of said endless conveyor chain and of said molds for guiding said molds onto said sections.

4. The apparatus, as set forth in claim 2, wherein
    said means for turning said covers into their open positions comprises a first guide member engaging and turning said covers during the movement of said molds before the latter reach said first station,
    said guide means for retaining said covers in their open position comprises a second guide member disposed above said endless conveyor chain, and
    said second guide member engages said covers emerging from said first guide member in their open position, so that said molds reach said first station in their open position, to be closed again upon passing said first station.

5. The apparatus, as set forth in claim 2, wherein
    said first station for feeding raw material into said molds comprises
    a hopper adapted to receive raw material to be vulcanized,
    a rolling mill disposed below said hopper and receiving said raw material from said hopper to emerge from said rolling mill in form of a ribbon,
    a stamping press disposed above said endless conveyor chain,
    guide rollers guiding said ribbon emerging from said rolling mill to said stamping press,
    said stamping press being adapted to stamp out pieces of said ribbon,
    said molds receiving said pieces stamped out from said ribbon, and
    additional rollers between said stamping press and said hopper for a return feeding of the remainder of said ribbon.

6. The apparatus, as set forth in claim 2, wherein
    said second station comprises
    a removal plate having an engaging face, a tube secured to said removal plate and connecting said engaging face of said removal plate with said molds to a vacuum source, and means for lifting and lowering, respectively, said removal plate and said tube, thereby lifting said vulcanized articles from the corresponding of said molds.

7. The apparatus, as set forth in claim 6, wherein said lifting and lowering means comprises a pressure cylinder supported by said housing, a piston reciprocating in said cylinder, a rod secured to said piston, a cord secured to the free end of said rod and connected to said removal plate, a chute disposed on said housing having a trap door, and said cord carrying said removal plate for lifting said vulcanized articles from said molds.

8. The apparatus, as set forth in claim 2, comprising a third station disposed between said first and said second station, downstream from the latter, and comprising brushes adapted to clean said molds after the removal of said vulcanized articles from said molds.

9. The apparatus, as set forth in claim 8, comprising a fourth station disposed between said first and said third station, downstream from the latter and including a substantially vertically disposed suction pipe having a mouth at its lower end opposite said molds for the removal of any foreign matter from said molds.

10. The apparatus, as set forth in claim 2, including a spraying device disposed opposite said molds between said first and said fourth station for spraying the inside of said molds with an anti-adhesive liquid.

References Cited by the Examiner

UNITED STATES PATENTS

| | | |
|---|---|---|
| 181,920 | 9/76 | Montaghie. |
| 786,773 | 4/05 | Marsh. |
| 1,949,175 | 2/34 | Netzel _____ 18—6 |
| 1,965,732 | 7/34 | Bisterfield _____ 18—20 |
| 2,014,468 | 9/35 | Clayton _____ 18—4 |
| 2,055,742 | 9/36 | Burke _____ 18—20 |
| 2,094,823 | 10/37 | Sample et al. |
| 2,103,860 | 12/37 | Mazzeo _____ 18—4 |
| 2,291,097 | 7/42 | Mooney _____ 25—99 |
| 2,365,804 | 12/44 | Clerke _____ 18—6 X |
| 2,538,972 | 1/51 | Magnani. |
| 2,689,974 | 9/54 | Meyer. |
| 2,755,505 | 7/56 | Bishop _____ 18—4 |
| 2,835,016 | 5/58 | Dixon. |
| 2,912,717 | 11/59 | Yarrison et al. _____ 18—4 |
| 2,958,095 | 11/60 | Ahlefeld et al. _____ 18—4 |

FOREIGN PATENTS 480,491    8/29   Germany.

OTHER REFERENCES

Catalogue of Bergen Machine Tool Co. At last A Machine To Remove Concrete "build up" from Plain Pallets. Received in Patent Office March 7, 1950.

WILLIAM J. STEPHENSON, *Primary Exmainer.*